United States Patent
Endo (10) Patent No.: US 10,328,585 B2
(45) Date of Patent: Jun. 25, 2019

(54) ROBOT CONTROL DEVICE AND ROBOT SYSTEM

(71) Applicant: DENSO WAVE INCORPORATED, Chita-gun, Aichi-pref. (JP)

(72) Inventor: Hiroshi Endo, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 163 days.

(21) Appl. No.: 15/341,744

(22) Filed: Nov. 2, 2016

(65) Prior Publication Data
US 2017/0151681 A1    Jun. 1, 2017

(30) Foreign Application Priority Data
Nov. 30, 2015  (JP) .................................. 2015-233460

(51) Int. Cl.
*B25J 19/06*    (2006.01)

(52) U.S. Cl.
CPC ...................................... *B25J 19/06* (2013.01)

(58) Field of Classification Search
CPC ... B25J 19/06; B25J 19/1674; G05B 19/0428; G05B 19/058; G05B 2219/39447; G05B 2219/50198; G05B 19/406
See application file for complete search history.

(56) References Cited

U.S. PATENT DOCUMENTS

| | | | | |
|---|---|---|---|---|
| 2004/0078116 A1* | 4/2004 | Hashimoto | ............... | B25J 13/06 700/264 |
| 2004/0210323 A1* | 10/2004 | Muneta | .................... | G05B 9/02 700/21 |
| 2006/0214618 A1* | 9/2006 | Hashimoto | .......... | G05B 19/406 318/445 |
| 2007/0096674 A1* | 5/2007 | Hashimoto | ............ | B25J 9/1674 318/568.13 |
| 2009/0177306 A1* | 7/2009 | Bosga | ..................... | B30B 1/266 700/103 |
| 2009/0204261 A1* | 8/2009 | Strand | .................... | B25J 9/1656 700/264 |
| 2009/0222107 A1* | 9/2009 | Moddemann | ..... | H04L 12/40169 700/21 |

(Continued)

FOREIGN PATENT DOCUMENTS

JP         2006-107050 A        4/2006
KR       101375340 B1  *     3/2014

*Primary Examiner* — Dale Moyer
(74) *Attorney, Agent, or Firm* — Oliff PLC (57) ABSTRACT

A robot control device provided correspondingly to each of a plurality of robots, individually, includes an input interface unit, a control unit, an output interface unit, and a safety circuit unit. The input interface unit receives a signal from an outside of the robot control device. The control unit stops an operation of the corresponding robot when determining that a safety signal is not input to the input interface unit. The output interface unit outputs a signal to the outside of the robot control device. The safety circuit unit has a function of monitoring whether a failure occurs in the safety circuit unit. The safety circuit unit outputs a signal same as the safety signal to the output interface unit when determining that no failure occurs in the safety circuit unit, and determining that the safety signal is input to the input interface unit.

7 Claims, 5 Drawing Sheets

(56) References Cited

U.S. PATENT DOCUMENTS

| | | | |
|---|---|---|---|
| 2010/0268386 A1* | 10/2010 | Kiyota | B25J 9/1674 700/264 |
| 2011/0098830 A1* | 4/2011 | Weddingfeld | G05B 9/02 700/79 |
| 2016/0193730 A1* | 7/2016 | Kawase | B25J 9/1674 700/249 |

* cited by examiner

ROBOT CONTROL DEVICE AND ROBOT SYSTEM

CROSS REFERENCE TO RELATED APPLICATIONS

The present application is based on and claims priority to Japanese Patent Application No. 2015-233460 filed on Nov. 30, 2015, the disclosure of which is incorporated herein by reference.

TECHNICAL FIELD

The present disclosure relates to robot control devices that are provided correspondingly to respective multiple robots, individually, and control driving of the respective robots, and a robot system including the robot control devices.

BACKGROUND

As a robot system of this type, a robot system that performs a collaboration control of the multiple robots in a production line has been known (for example, see JP 2006-107050 A). In the system, one of the multiple robots is set as a master robot, and the remaining robots are set as slave robots.

In recent years, in order to improve the efficiency of production manufacturing, it is conceivable that the robots and an operator perform work in collaboration with each other in the production line. In that case, the operator may work in a place close to the master robot and the slave robots. Thus, when, for example, an emergency stop switch is pressed by the operator, there is a need to ensure the stop of all the robots regardless of the master robot or the slave robots.

In this case, when a safety device such as the emergency stop switch is connected to the control device corresponding to the master robot, in order to ensure the stop of all the robots, it is conceivable to output an operation stop command for the slave robots from the control device corresponding to the master robot which determines the stop of an input of a safety signal from the safety device to the control devices corresponding to the slave robots. However, in that case, different control devices such as the dedicated control device for the master robot and the dedicated control device for the slave robots are present in the production line. The presence of the different control devices causes an increase in a load of a production management for the control devices such that there is a need to prepare a production facility for manufacturing the respective different control devices, on a manufacturer of the control devices.

SUMMARY

It is an object of the present disclosure to provide a robot control device that can be used for either a master robot or a slave robot, and a robot system including the robot control device.

A robot control device according to an aspect of the present disclosure is provided correspondingly to each of a plurality of robots, individually, and controls driving of the corresponding robot. The robot control device includes an input interface unit, a control unit, an output interface unit, and a safety circuit unit. The input interface unit receives a signal from an outside of the robot control device. The control unit stops an operation of the corresponding robot when determining that a safety signal is not input to the input interface unit. The output interface unit outputs a signal to the outside of the robot control device. The safety circuit unit has a function of monitoring whether a failure occurs in the safety circuit unit. The safety circuit unit outputs a signal same as the safety signal to the output interface unit when determining that no failure occurs in the safety circuit unit, and determining that the safety signal is input to the input interface unit.

In the robot control device, the control unit stops the operation of the corresponding robot when determining that the safety signal is not input to the input interface unit. In the robot control device, the safety circuit unit has a function of monitoring whether the failure occurs in the safety circuit unit. The safety circuit unit outputs the signal same as the safety signal to the output interface unit when determining that no failure occurs in the safety circuit unit, and determining that the safety signal is input to the input interface unit. According to the above-described configuration, when the failure occurs in the safety circuit unit, the signal same as the safety signal is not output from the output interface unit. Thus, in the case where the input interface units of the robot control devices corresponding to the slave robots (hereinafter referred to as "slave control devices") are connected to the output interface unit of the robot control device corresponding to the master robot (hereinafter referred to as "master control device"), the signal same as the safety signal is not output from the safety circuit unit of the master control device when the failure occurs in the safety circuit unit of the master control device. As a result, the signal same as the safety signal is not output to the control units of the slave control devices, and the operation of the slave robots can be stopped. As described above, according to the above-described robot control device, it can be ensured that the signal having the same degree of reliability as that of the safety signal output from the safety circuit unit of the master control device is input to the control units of the slave control devices. With the above-described configuration, the stop of the operation of the master robot and the slave robots can be ensured.

In this example, the robot control device includes a configuration in which the signal same as the safety signal is output from the safety circuit unit to the output interface unit and a configuration in which the safety signal is input to the control unit through the input interface unit. Thus, the input interface units of the slave control devices are connected to the output interface unit of the master control device, thereby being capable of inputting the safety signal or the signal having the degree of reliability equivalent to the safety signal to all of those control devices. With the above-described configuration, all of the respective robot control devices for controlling the master robot and the slave robots can have the same configuration. Therefore, the robot control devices having the same configuration can be used regardless of whether the collaboration control of the master robot and the slave robots is performed, or the control of one robot is performed in the robot system.

A robot system according to another aspect of the present disclosure includes the above-described robot control devices, which are provided correspondingly to the respective robots, individually, and the robot control devices include a first robot control device and a second robot control device. The input interface unit of the first robot control device receives the safety signal from an output source of the safety signal, and the input interface unit of the second robot control device is connected with the output interface unit of the first robot control device.

According to the above-described robot system, it can be ensured that the signal having the same degree of reliability as that of the safety signal output from the safety circuit unit of the first robot control device is input to the control unit of the second robot control device.

A robot system according to another aspect of the present disclosure includes the above-described robot control devices, which are provided correspondingly to the respective robots, individually, and a host control device that controls processing in the respective robot control devices. One of the respective robot control devices is set as a reference control device, and the input interface unit of the reference control device receives the safety signal from an output source of the safety signal. The input interface unit of the robot control device other than the reference control device is connected with the output interface unit of the reference control device through the host control device.

According to the above-described robot system, it can be ensured that the signal having the same degree of reliability as that of the safety signal output from the safety circuit unit of the reference control device is input to the control unit of the robot control device other than the reference control device via the host control device.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Prior to a description of embodiments of the present disclosure, various aspects of the present disclosure will be described.

According to a first aspect of the present disclosure, a robot control device is provided correspondingly to each of a plurality of robots, individually, and controls driving of the corresponding robot. The robot control device includes an input interface unit, a control unit, an output interface unit, and a safety circuit unit. The input interface unit receives a signal from an outside of the robot control device. The control unit stops an operation of the corresponding robot when determining that a safety signal is not input to the input interface unit. The output interface unit outputs a signal to the outside of the robot control device. The safety circuit unit has a function of monitoring whether a failure occurs in the safety circuit unit. The safety circuit unit outputs the signal same as the safety signal to the output interface unit when determining that no failure occurs in the safety circuit unit, and determining that the safety signal is input to the input interface unit.

In the robot control device, the control unit stops the operation of the corresponding robot when determining that the safety signal is not input to the input interface unit. In the robot control device, the safety circuit unit has a function of monitoring whether the failure occurs in the safety circuit unit. The safety circuit unit outputs the signal same as the safety signal to the output interface unit when determining that no failure occurs in the safety circuit unit, and determining that the safety signal is input to the input interface unit. According to the above-described configuration, when the failure occurs in the safety circuit unit, the signal same as the safety signal is not output from the output interface unit. Thus, in the case where the input interface units of the robot control devices corresponding to the slave robots (hereinafter referred to as "slave control devices") are connected to the output interface unit of the robot control device corresponding to the master robot (hereinafter referred to as "master control device"), the signal same as the safety signal is not output from the safety circuit unit of the master control device when the failure occurs in the safety circuit unit of the master control device. As a result, the signal same as the safety signal is not output to the control units of the slave control devices, and the operation of the slave robots can be stopped. As described above, according to the above-described robot control device, it can be ensured that the signal having the same degree of reliability as that of the safety signal output from the safety circuit unit of the master control device is input to the control units of the slave control devices. With the above-described configuration, the stop of the operation of the master robot and the slave robots can be ensured.

In this example, the robot control device includes a configuration in which the signal same as the safety signal is output from the safety circuit unit to the output interface unit and a configuration in which the safety signal is input to the control unit through the input interface unit. Thus, the input interface units of the slave control devices are connected to the output interface unit of the master control device, thereby being capable of inputting the safety signal or the signal having the degree of reliability equivalent to the safety signal to all of those control devices. With the above-described configuration, all of the respective robot control devices for controlling the master robot and the slave robots can have the same configuration. Therefore, the robot control devices having the same configuration can be used regardless of whether the collaboration control of the master robot and the slave robots is performed, or the control of one robot is performed in the robot system.

In a robot control device according to a second aspect of the present disclosure, the safety circuit unit cuts off a power to be supplied to the corresponding robot when determining that the failure occurs in the safety circuit unit, or determining that the safety signal is not input to the input interface unit.

In the robot control device, when it is determined that the failure occurs in the safety circuit unit, or when it is determined that the safety signal is not input to the input interface unit, the power to be supplied to the corresponding robot can be cut off, and the operation of the robot can be stopped by the safety circuit unit with high reliability which can monitor whether the failure occurs in the safety circuit unit. Further, in the robot control device, when the input interface units of the slave control devices are connected to the output interface unit of the master control device, the operation of the robots corresponding to the slave control devices can be stopped with the degree of reliability equivalent to that of the master control device.

In a robot control device according to a third aspect of the present disclosure, the safety circuit unit includes multiple signal input units, multiple monitoring units, and multiple signal output units. The signal input units are connected to the input interface unit and transmit the safety signal input to the input interface unit. The monitoring units are connected correspondingly to the signal input units, respectively, receive the safety signal transmitted through the corresponding signal input units, and output the signals as the safety signal. The signal output units are connected correspondingly to the monitoring units, respectively, and transmit signals same as the safety signals output from the corresponding monitoring units. The output interface unit outputs the signals same as the safety signals transmitted through the signal output units to the outside of the robot control device. Each of the monitoring units has a function of monitoring whether a failure occurs in the corresponding signal input unit and the corresponding signal output unit connected to the subject monitoring unit, and can acquire monitoring results of each other. Each of the monitoring units outputs the signal same as the safety signal to the output interface unit through the corresponding signal output unit when determining that the monitoring result of the subject monitoring unit matches the acquired monitoring results, and determining that the safety signal is input through the corresponding signal input unit.

In the robot control device, the safety circuit unit includes the multiple signal input units that transmit the safety signal input to the input interface unit, the monitoring units that are connected correspondingly to the signal input units, respectively, and the multiple signal output units that are connected correspondingly to the monitoring units, respectively. The reason that the multiple signal input units and the multiple signal output units are provided is because the reliability of the safety circuit unit is enhanced by the provision of a multiple system.

Each of the monitoring units has a function of monitoring whether a failure occurs in the corresponding signal input unit and the corresponding signal output unit connected to the subject monitoring unit, and can acquire monitoring results of each other. Each of the monitoring units outputs the signal same as the safety signal to the output interface unit through the corresponding signal output unit when determining that the monitoring result of the subject monitoring unit matches the acquired monitoring results, and determining that the safety signal is input through the corresponding signal input unit. According to the above-described configuration, when it is determined that the monitoring result of the subject monitoring unit does not match the acquired monitoring results, each of the monitoring units does not output the signal same as the safety signal to the output interface unit through the corresponding signal output unit. Thus, with the determination that no failure occurs in each of the signal input units and the signal output units, the signal same as the safety signal can be output, and the degree of reliability of the signal same as the safety signal output to the outside from the output interface unit can be enhanced.

A robot control device according to a fourth aspect of the present disclosure is applied to a robot system having a normally closed stop switch for generating the safety signal, and each of the signal input units includes an input side power supply and a resistive element. The input side power supply is connected to a first end of the stop switch. The resistive element connects a second end of the stop switch to a ground. Each of the signal output units includes an exciting coil, an exciting switch, and a normally opened insulation switch. The exciting switch is closed to feed power from an output side power supply to the exciting coil, and is opened to stop the power feeding from the output side power supply to the exciting coil. The normally opened insulation switch is closed by feeding the power to the exciting coil and is opened by stopping the power feeding to the exciting coil. The exciting coil and the insulation switch are electrically insulated from each other, the insulation switch is connected with the output interface unit. Each of the monitoring units outputs the signal same as the safety signal to the output interface unit by closing the exciting switch when determining that the monitoring result of the subject monitoring unit matches the acquired monitoring results, and determining that the subject monitoring unit receives the safety signal through the corresponding signal input unit.

In the above-described robot control device, each of the signal input units includes the input side power supply that is connected to the first end of the stop switch, and the resistive element that connects the second end of the stop switch to the ground. Thus, when the stop switch is connected to the input interface unit, a closed circuit including the input side power supply, the stop switch, the resistive element, and the ground is formed. In the above-described configuration, an operating state of the stop switch is switched with the result that a potential difference between an electric path connecting the second end of the stop switch to the resistive element and the ground is changed. Therefore, each of the monitoring units can determine whether the safety signal has been input, on the basis of the potential difference.

In this case, for example, when the master control device is connected with the stop switch, and the output interface unit of the master control device is connected with the input interface units of the slave control devices, the ground potential of the master control device may be different from the ground potential of the slave control devices. In this situation, there is a risk that the degree of reliability of the signal same as the safety signal is reduced such that the signal same as the safety signal is lost or distorted in a path for transmitting the signal same as the safety signal from the master control device to the slave control devices. This may cause a determination precision in each of the monitoring units of whether the safety signal has been input, to be reduced.

Under the circumstance, in the robot control device, each of the signal output units has the insulation switch, and the insulation switch is connected with the output interface unit. According to the above-described configuration, when the output interface unit of one robot control device connected with the stop switch is connected with the input interface unit of another robot control device, the output source of the safety signal high in the degree of reliability equivalent to the stop switch can be simulated with the help of the configuration of the insulation switch of the robot control device connected with the stop switch on the input interface unit side of another robot control device. In the above-described configuration, the exciting switch provided in each of the signal output units is closed, as a result of which the power is fed from the output side power supply to the exciting coil, and the insulation switch is closed. Therefore, the signal same as the safety signal is output to the output interface unit.

In the above-described robot control device, the exciting coil and the insulation switch are electrically insulated from each other. Thus, in the case where the exciting switch is closed to output the signal same as the safety signal to the output interface unit, even if the ground potential is different between one robot control device connected with the stop switch and another robot control device, the signal same as the safety signal can be transmitted from the robot control device connected with the stop switch to another robot control device without any reduction in the degree of reliability of the signal same as the safety signal.

In a robot control device according to a fifth aspect of the present disclosure, the insulation switch is set as a first insulation switch, and a second insulation switch is further provided. The second insulation switch is opened and closed mechanically in conjunction with the first insulation switch, is opened when the first insulation switch is opened, and is closed when the first insulation switch is closed. The first insulation switch and the second insulation switch are electrically insulated from each other. Each of the monitoring units has a function of monitoring whether an failure occurs in the second insulation switch, and prohibits an output of the signal same as the safety signal to the output interface unit when determining that the failure occurs in the second insulation switch.

In the above-described robot control device, the first insulation switch and the second insulation switch are put into the same operating state mechanically in conjunction with each other. Thus, whether the failure occurs in the second insulation switch is monitored, and thereby whether the failure occurs in the first insulation switch can be monitored. Each of the monitoring units prohibits the output of the safety signal to the output interface unit when determining that the failure occurs in the second insulation switch. With the above-described configuration, the degree of reliability of the signal same as the safety signal output from the output interface unit to the outside can be enhanced.

Moreover, in the above-described robot control device, whether the failure occurs is monitored with the use of the second insulation switch electrically insulated from the first insulation switch. Thus, whether the failure occurs in the first insulation switch can be monitored without affecting the signal path that connects the first insulation switch to the output interface unit and transmits the signal same as the safety signal.

A robot system according to a sixth aspect of the present disclosure includes the robot control devices according to any one of first to fifth aspects, which are provided correspondingly to the respective robots, individually, and the robot control devices include a first robot control device and a second robot control device. The input interface unit of the first robot control device receives the safety signal from an output source of the safety signal, and the input interface unit of the second robot control device is connected with the output interface unit of the first robot control device.

According to the above-described robot system, it can be ensured that the signal having the same degree of reliability as that of the safety signal output from the safety circuit unit of the first robot control device is input to the control unit of the second robot control device.

A robot system according to a seventh aspect of the present disclosure includes the robot control devices according to any one of the first to fifth aspects, which are provided correspondingly to the respective robots, individually, and a host control device that controls processing in the respective robot control devices. One of the respective robot control devices is set as a reference control device, and the input interface unit of the reference control device receives the safety signal from an output source of the safety signal. The input interface unit of the robot control device other than the reference control device is connected with the output interface unit of the reference control device through the host control device.

According to the above-described robot system, it can be ensured that the signal having the same degree of reliability as that of the safety signal output from the safety circuit unit of the reference control device is input to the control unit of the robot control device other than the reference control device via the host control device.

First Embodiment

Hereinafter, a robot control device according to a first embodiment of the present disclosure will be described with reference to the accompanying drawings. Robots according to the present embodiment are used, for example, as industrial robots in an assembly system such as a machine assembly plant.

Figure 1:
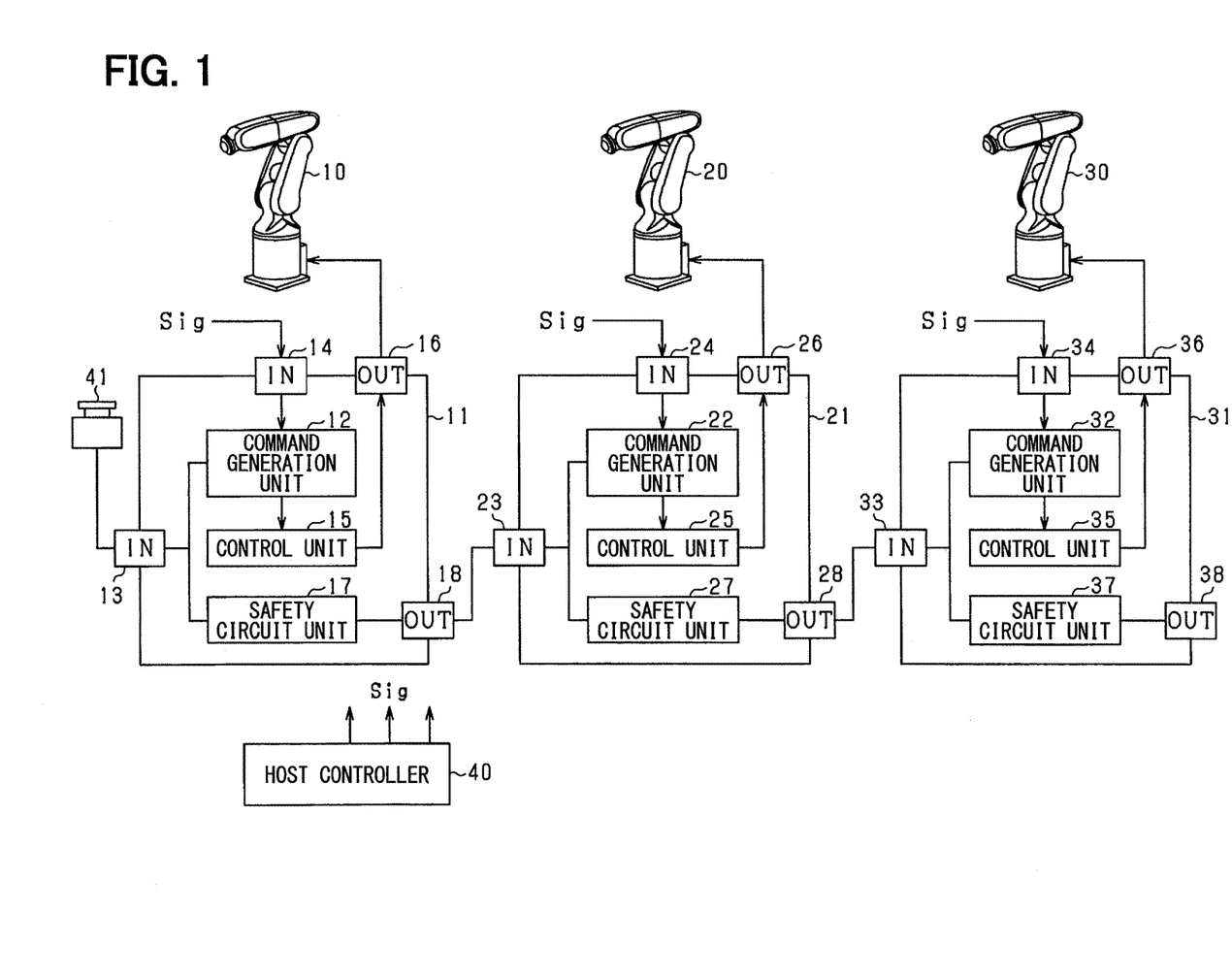
FIG. 1 is a diagram of an overall configuration of a robot system according to a first embodiment.

A robot system includes a first robot 10, a second robot 20, and a third robot 30. The respective robots 10, 20 and 30 are installed on an installation surface (e.g., floor), for example, so as to be adjacent to each other. In the present embodiment, as the robots 10, 20 and 30, robots including multiple rotating portions, and joints that sequentially couple the respective rotating portions with each other, and allow the adjacent rotating portions to be rotatable relative to each other are used. Specifically, 6-axis vertical articulated robots are used. The respective rotating portions of the respective robots 10, 20, and 30 are driven by motors (e.g., three-phase servo motors) not shown which are provided correspondingly to the respective rotating portions.

The first robot 10 is connected with a first controller 11. The first controller 11 includes a command generation unit 12, a first input interface unit (IN) 13, and a second input interface unit (IN) 14. In the present embodiment, the first input interface unit 13 is connected directly with an emergency stop switch 41 that can output a safety signal through a communication line. When the safety signal is output from the emergency stop switch 41, the operation of the respective robots 10, 20, and 30 is permitted, and when the emergency stop switch 41 is pressed by an operator to stop the output of the safety signal, the operation of the respective robots 10, 20, and 30 is prohibited.

Meanwhile, a safety device connected to the first input interface unit 13 is not limited to the emergency stop switch 41, but may be configured by, for example, an enable switch that is switched to three positions of off, on, and off by the manual operation of the operator.

In the present embodiment, the first robot 10 to be controlled by the first controller 11 connected with the emergency stop switch 41 can be called "master robot", and the other second and third robots 20 and 30 can be called "slave robots".

When it is determined that the safety signal is input to the command generation unit 12 through the first input interface unit 13, and an operation enable signal Sig is input to the command generation unit 12 from an external host controller 40 through the second input interface unit 14, the command generation unit 12 generates an operation command value for operating the first robot 10. The operation command value is calculated, for example, as a speed pattern (e.g., a trapezoidal pattern) of the motor for each of the rotating portions when moving a control point (e.g., TCP) of the first robot 10 from an operation start point to an operation end point. Meanwhile, in the present embodiment, it is assumed that the speed pattern of the motor for each of the rotating portions when moving from the operation start point to the operation end point is stored in a memory of the command generation unit 12.

The first controller 11 includes a control unit 15. The control unit 15 generates a control signal to be output to a drive portion (e.g., three-phase inverter) connected to each motor of the first robot 10, on the basis of the operation command value generated by the command generation unit 12. The control unit 15 outputs the generated control signal to the first robot 10 through a first output interface unit (OUT) 16. In response to the control signal, the first robot 10 operates.

When it is determined that any one of the safety signal and the operation enable signal Sig is not input to the command generation unit 12, the command generation unit 12 generates the operation command value for stopping the operation of the first robot 10. In that case, the control unit 15 generates the control signal for stopping the operation of the first robot 10 on the basis of the operation command value, and outputs the generated control signal to the drive portion. In response to the control signal, the operation of the first robot 10 is stopped.

The second robot 20 is connected with a second controller 21. The second controller 21 includes a command generation unit 22, a first input interface unit (IN) 23, a second input interface unit (IN) 24, a control unit 25, and a first output interface unit (OUT) 26. In the present embodiment, because the second controller 21 has the same configuration as that of the first controller 11, a detailed description of the second controller 21 will be omitted.

The third robot 30 is connected with a third controller 31. The third robot 30 is connected with a third controller 31. The third controller 31 includes a command generation unit 32, a first input interface unit (IN) 33, a second input interface unit (IN) 34, a control unit 35, and a first output interface unit (OUT) 36. In the present embodiment, because the third controller 31 has the same configuration as that of the first controller 11, a detailed description of the third controller 31 will be omitted.

The first, second, and third controllers 11, 21, and 31 include safety circuit units 17, 27, and 37, and second output interface units (OUT) 18, 28, and 38, respectively. The respective controllers 11, 21, and 31 are connected in series with each other by connecting the second output interface units to the first input interface units through respective communication lines.

The safety circuit unit 17 of the first controller 11 receives a safety signal from the first input interface unit 13. The safety circuit unit 17 can output the signal same as the input safety signal to the second output interface unit 18. The second output interface unit 18 is connected directly with the first input interface unit 23 of the second controller 21 through the communication line. The first input interface unit 23 of the second controller 21 receives the signal same as the safety signal output from the second output interface unit 18. The second controller 21 recognizes the input signal same as the safety signal. The safety circuit unit 27 of the second controller 21 receives the safety signal from the first input interface unit 23. The safety circuit unit 27 can output the signal same as the input safety signal to the second output interface unit 28.

The second output interface unit 28 is connected directly with the first input interface unit 33 of the third controller 31 through the communication line. The safety circuit unit 37 of the third controller 31 receives the safety signal from the first input interface unit 33. The safety circuit unit 37 can output the signal same as the input safety signal to the second output interface unit 38. Meanwhile, in the present embodiment, the second output interface unit 38 is not connected with the first input interface unit of another controller.

Incidentally, the first controller 11 is configured in such a manner that the command generation unit 12, the control unit 15, and the safety circuit unit 17 are housed in a casing.

The second controller 21 and the third controller 31 also have the same configuration as that of the first controller 11.

The respective safety circuit units 17, 27, and 37 are provided to distribute the safety signal output from the emergency stop switch 41 to the other controller while maintaining the degree of reliability of the safety signal. In the present embodiment, the respective safety circuit units 17, 27, and 37 are configured not to receive the command signals such as the control signals from the control units 15, 25, and 35. Hereinafter, the safety circuit units will be described. Incidentally, because the configurations of the respective safety circuit units 17, 27, and 37 according to the present embodiment are identical with each other, the safety circuit unit 17 configuring the first controller 11 will be described as an example.

Figure 2:
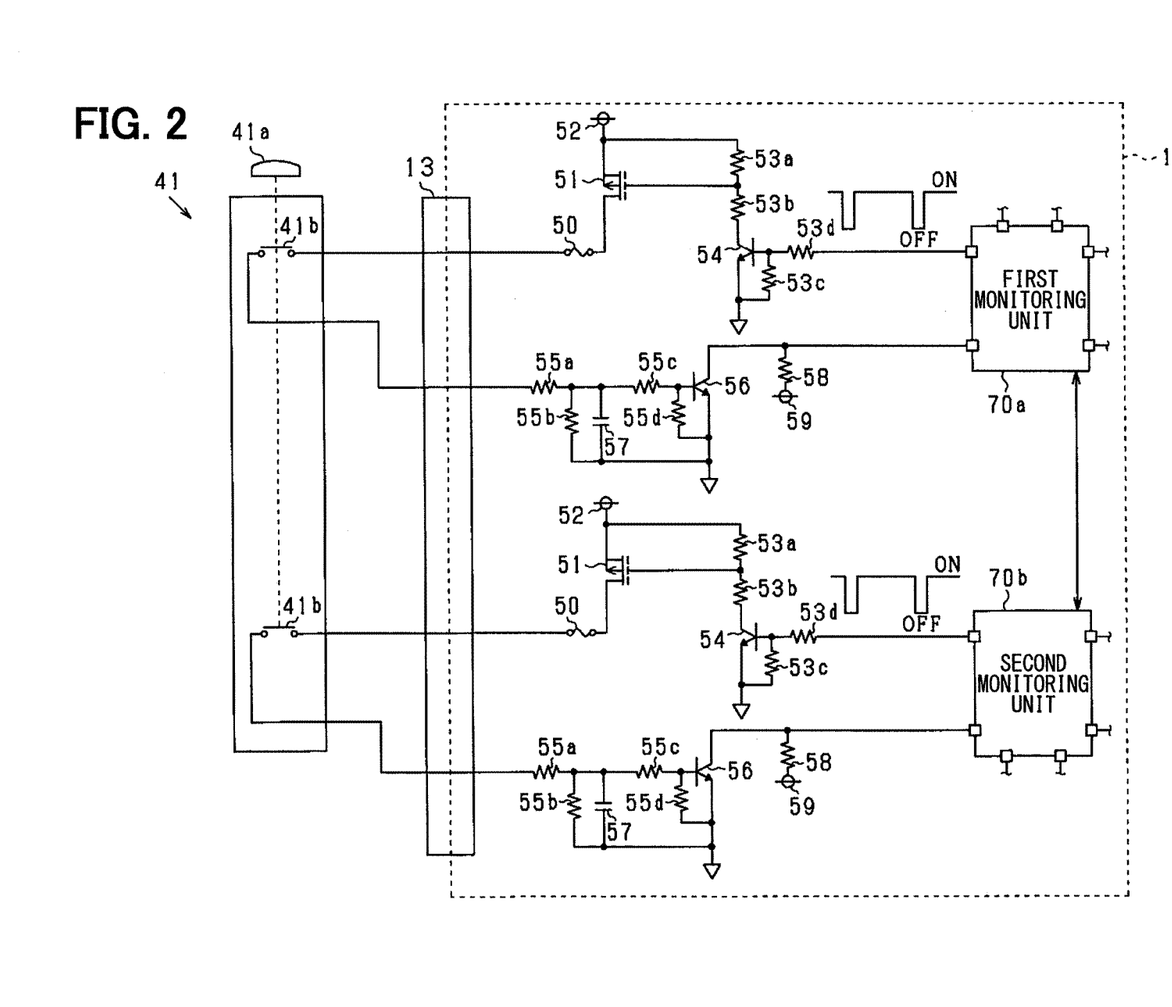
FIG. 2 is a circuit diagram illustrating a signal input unit of a safety circuit unit.

First, a signal input unit that is a configuration of an input side of the safety circuit unit 17 will be described with reference to FIG. 2.

The first input interface unit 13 of the safety circuit unit 17 is connected with the emergency stop switch 41 through the communication line. The emergency stop switch 41 includes a stop button 41a and duplexed emergency switches 41b (relays). The emergency stop switch 41 is a normally closed switch, and the stop button 41a is pressed by the operator to switch the emergency switches 41b to an opened state.

A first end of each of the emergency switches 41b is connected with a first end of a poly-switch 50 through the communication line and the first input interface unit 13. A second end of the poly-switch 50 is connected with a first input side power supply 52 (constant voltage power supply) through a first input side switch 51. In the present embodiment, a p-channel MOSFET is used as the first input side switch 51. A drain of the first input side switch 51 is connected to the second end of the poly-switch 50, and a source of the first input side switch 51 is connected with the first input side power supply 52.

A source of the first input side switch 51 is connected to the ground through a series connection of resistive elements 53a, 53b, and a second input side switch 54. In the present embodiment, a bipolar transistor is used as the second input side switch 54. A collector of the second input side switch 54 is connected with the resistive element 53b, and an emitter of the second input side switch 54 is connected with the ground. A connection point of the resistive elements 53a and 53b is connected with a gate of the first input side switch 51.

The emitter and a base of the second input side switch 54 are connected to each other through a resistive element 53c. The base of the second input side switch 54 is connected with a terminal of a first monitoring unit 70a for monitoring whether a failure occurs in the signal input unit. Incidentally, in the present embodiment, the first monitoring unit 70a is configured by a field programmable gate array (FPGA).

A second end of the emergency switches 41b is connected to the ground through the communication line, the first input interface unit 13, and resistive elements 55a, 55b. A connection point between the resistive elements 55a and 55b is connected with a base of a third input side switch 56 that is a bipolar transistor through a resistive element 55c. Incidentally, the connection point between the resistive elements 55a and 55b is connected to the ground through a capacitor 57.

An emitter of the third input side switch 56 is connected with the ground, and a collector of the third input side switch 56 is connected with a second input side power supply 59 (constant voltage power supply) through a resistive element 58. A connection point between the collector of the third input side switch 56 and the resistive element 58 is connected with a terminal of the first monitoring unit 70a.

As described above, the emergency stop switch 41 includes the duplexed emergency switches 41b. Thus, in the present embodiment, the signal input units for transmitting the safety signal output from the emergency stop switch 41 are also duplexed, and the safety circuit unit 17 includes a second monitoring unit 70b. The second monitoring unit 70b monitors whether a failure occurs in another signal input unit different from that to be monitored by the first monitoring unit 70a in the duplexed signal input units. Incidentally, in the present embodiment, the second monitoring unit 70b is configured by an FPGA. In the present embodiment, for convenience, the respective components of the signal input unit to be monitored by the second monitoring unit 70b are denoted by the same reference numerals or symbols as those of the respective components of the signal input unit to be monitored by the first monitoring unit 70a.

Basically, the first monitoring unit 70a operates the second input side switch 54 to be in a closed state (off state), to thereby operate the first input side switch 51 to be in a closed state (on state). In that configuration, when the stop button 41a is not pressed, the emergency switches 41b are put into the closed state to form a closed circuit including the first input side power supply 52, the first input side switch 51, the poly-switch 50, the emergency switches 41b, the resistive elements 55a, 55b, and the ground. As a result, a DC voltage output from the first input side power supply 52 is applied to the base of the third input side switch 56 configuring an emitter ground amplifier circuit. With the above-described configuration, a signal of a logic H is output from the connection point (an output point of the emitter ground amplifier circuit) between the collector of the third input side switch 56 and the resistive element 58. The first monitoring unit 70a determines that the safety signal is input with the input of the signal of the logic H.

On the other hand, when the stop button 41a is pressed, the emergency switches 41b are put into the open state, and the above-described closed circuit is not formed. As a result, the DC voltage output from the first input side power supply 52 is not applied to the base of the third input side switch 56. With the above-described configuration, a signal of a logic L is output from the connection point between the collector of the third input side switch 56 and the resistive element 58. The first monitoring unit 70a determines that the safety signal is not input with the input of the signal of the logic L.

Incidentally, as with the first monitoring unit 70a, the second monitoring unit 70b determines that the safety signal is input with a fact that the logic of the signal output from the connection point between the collector of the third input side switch 56 and the resistive element 58 is H, and determines that the safety signal is not input with a fact that the logic is L.

Each of the first monitoring unit 70a and the second monitoring unit 70b has a function of monitoring whether a failure occurs in the signal input unit connected with the corresponding monitoring unit. In the present embodiment, because a monitoring manner is identical between the first monitoring unit 70a and the second monitoring unit 70b, the first monitoring unit 70a will be described as an example.

The first monitoring unit 70a outputs pulse signals in which off signals are periodically inserted to the base of the second input side switch 54. When the stop button 41a is not pressed, and no failure occurs in the signal input unit, the output pulse signals return to the first monitoring unit 70a as the pulse signals output from the connection point between the collector of the third input side switch 56 and the resistive element 58. The first monitoring unit 70a determines that no failure including an abnormality in which the first input side switch 51 is fixed to the closed state occurs in the signal input unit with the return of the pulse signals.

In this example, the first monitoring unit 70a and the second monitoring unit 70b can acquire the monitoring results of the respective monitoring units. Each of the first monitoring unit 70a and the second monitoring unit 70b outputs the safety signal to the signal output unit to be described later from the corresponding monitoring unit when determining that the monitoring result of the subject monitoring unit matches the acquired monitoring result, and determining that the safety signal is input with respect to the corresponding signal input unit. On the other hand, each of the first monitoring unit 70a and the second monitoring unit 70b prohibits the safety signal from being output to the signal output unit from the corresponding monitoring unit when determining that the monitoring result of the subject monitoring unit does not match the acquired monitoring result with respect to the signal input unit.

Figure 3:
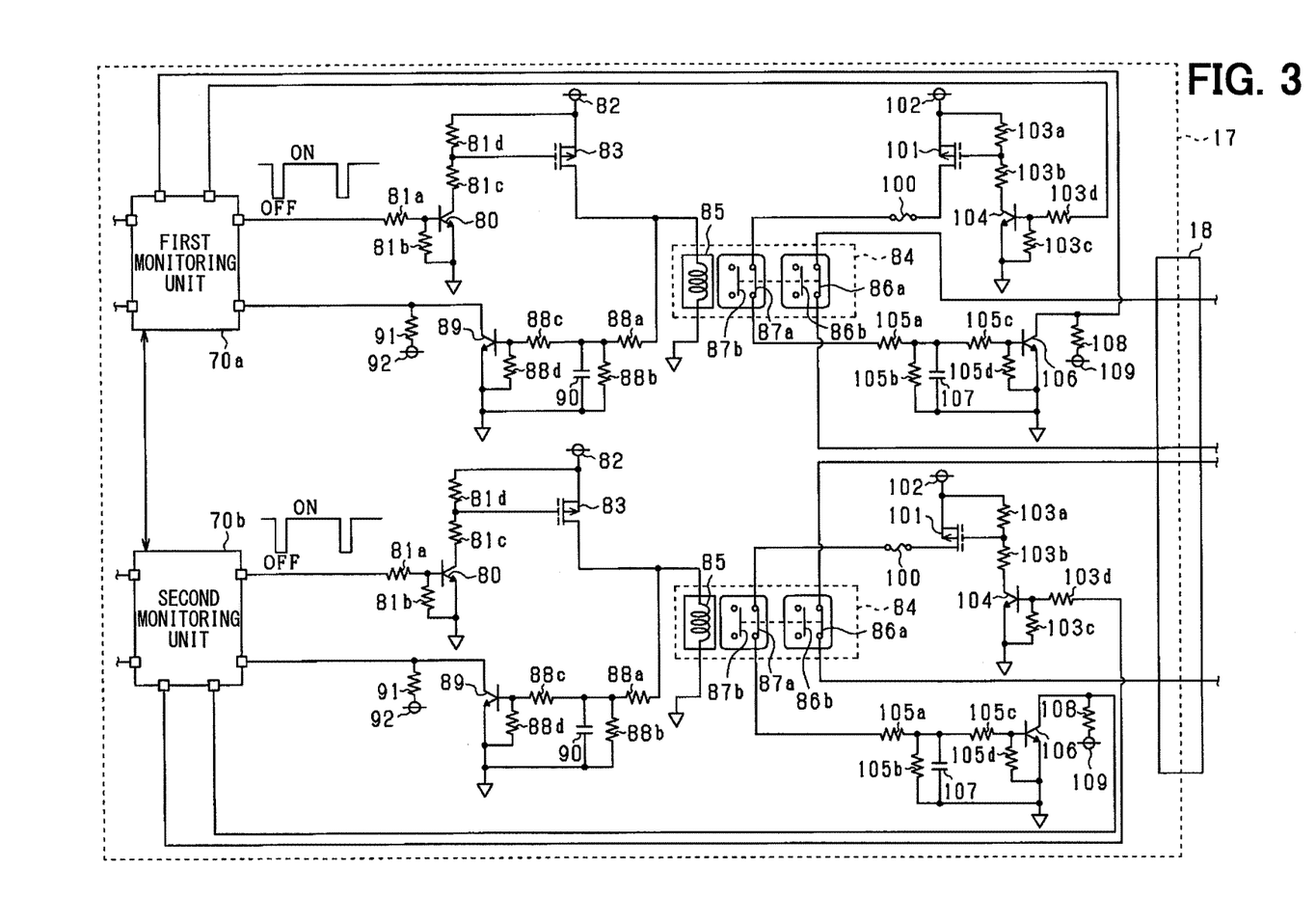
FIG. 3 is a circuit diagram illustrating a signal output unit of the safety circuit unit.

Subsequently, the signal output unit that is a configuration of an output side of the safety circuit unit 17 will be described with reference to FIG. 3.

A terminal of the first monitoring unit 70a is connected with the ground through resistive elements 81a and 81b. A connection point between the resistive elements 81a and 81b is connected with a base of a first output side switch 80 that is a bipolar transistor. An emitter of the first output side switch 80 is connected with the ground, and a collector of the first output side switch 80 is connected with a first output side power supply 82 (constant voltage power supply) through resistive elements 81c and 81d. The first output side power supply 82 is connected with a second output side switch 83 (corresponding to an exciting switch). In the present embodiment, a p-channel MOSFET is used as the second output side switch 83. A source of the second output side switch 83 is connected with the first output side power supply 82.

A drain of the second output side switch 83 is connected with the ground through an exciting coil 85 configuring a safety relay 84. The safety relay 84 includes first and second main switches 86a and 87a (corresponding to first and second insulation switches) of a normally open type and first and second sub-switches 86b and 87b of a normally closed type in addition to the exciting coil 85. The exciting coil 85 and the respective switches 86a, 87a, 86b, and 87b are electrically insulated from each other. The safety relay 84 has a mirror contact structure in which the respective switches 86a, 87a, 86b, and 87b are opened and closed mechanically in conjunction with each other. In more detail, the first and second sub-switches 86b and 87b are put into the closed state when the first and second main switches 86a and 87a are put into the open state, and the first and second sub-switches 86b and 87b are put into the open state when the first and second main switches 86a and 87a are put into the closed state.

A first end of the first main switch 86a is connected with a first end of the poly-switch 50 configuring the safety circuit unit 27 of the second controller 21 through the second output interface unit 18 and the first input interface unit 23 of the second controller 21. A second end of the first main switch 86a is connected with one end of the resistive element 55a configuring the safety circuit unit 27 of the second controller 21 through the second output interface unit 18 and the first input interface unit 23 of the second controller 21.

Incidentally, a connection manner between the second output interface unit 28 of the second controller 21 and the safety circuit unit 37 of the third controller 31 is identical with the connection manner between the second output interface unit 18 of the first controller 11 and the safety circuit unit 27 of the second controller 21 described above.

When it is determined that the safety signal is input, the first monitoring unit 70a basically operates the first output side switch 80 to be in the closed state, to thereby operate the second output side switch 83 to be in the closed state. With the above-described operation, a power is fed from the first output side power supply 82 to the exciting coil 85 to close the first main switch 86a of the normally open type. As a result, the signal same as the safety signal is output from the second output interface unit 18 to the first input interface unit 23 of the second controller 21.

When it is determined that the safety signal is not input, the first monitoring unit 70a operates the first output side switch 80 to be in the open state, to thereby operate the second output side switch 83 to be in the opened state. With the above-described operation, power feeding from the first output side power supply 82 to the exciting coil 85 is stopped to open the first main switch 86a. As a result, the output of the signal same as the safety signal to the first input interface unit 13 of the second controller 21 is stopped.

In the present embodiment, because the signal input units are duplicated, the signal output units are also duplexed. Incidentally, in the present embodiment, for convenience, the respective components of the signal output unit to be monitored by the first monitoring unit 70a are denoted by the same reference numerals or symbols as those of the respective components of the signal output unit to be monitored by the second monitoring unit 70b.

Each of the first monitoring unit 70a and the second monitoring unit 70b has a function of monitoring whether a failure occurs in the signal output unit connected with the corresponding monitoring unit. In the present embodiment, because a monitoring manner is identical between the first monitoring unit 70a and the second monitoring unit 70b, the first monitoring unit 70a will be described as an example.

A drain of the second output side switch 83 is connected with the ground through resistive elements 88a and 88b. A connection point between the resistive elements 88a and 88b is connected with a base of a third output side switch 89 that is a bipolar transistor through a resistive element 88c. Incidentally, the connection point between the resistive elements 88a and 88b is connected to the ground through a capacitor 90.

An emitter of the third output side switch 89 is connected with the ground, and a collector of the third output side switch 89 is connected with a second output side power supply 92 (constant voltage power supply) through a resistive element 91. A connection point between the collector of the third output side switch 89 and the resistive element 91 is connected with a terminal of the first monitoring unit 70a.

In the above-described configuration, the first monitoring unit 70a outputs pulse signals into which off signals are periodically inserted to the base of the first output side switch 80. When no failure occurs in the signal output unit, the output pulse signals return to the first monitoring unit 70a as the pulse signals output from the connection point between the collector of the third output side switch 89 and the resistive element 91. The first monitoring unit 70a determines that no failure including an abnormality in which the second output side switch 83 is fixed to the closed state occurs in the signal output unit with the return of the pulse signals. Incidentally, the off signals inserted into the pulse signals output from the first monitoring unit 70a are set with a duration in which the exciting coil 85 is not opened.

Each of the first monitoring unit 70a and the second monitoring unit 70b further has a function of monitoring whether a failure occurs in the first main switch 86a. In the present embodiment, because a monitoring manner is identical between the first monitoring unit 70a and the second monitoring unit 70b, the first monitoring unit 70a will be described as an example.

In the present embodiment, a configuration of monitoring whether the failure occurs in the first main switch 86a is identical with the configuration of the signal input unit. As illustrated in FIG. 3, the above-described configuration includes a poly-switch 100, a first monitoring switch 101, a first monitoring power supply 102, resistive elements 103a, 103b, 103c, a second monitoring switch 104, resistive elements 105a, 105b, 105c, 105d, a third monitoring switch 106, a capacitor 107, a resistive element 108, and a second monitoring power supply 109.

The first monitoring unit 70a outputs pulse signals in which off signals are periodically inserted to the base of the second monitoring switch 104. The first monitoring unit 70a determines that an abnormality in which the first main switch 86a is fixed to be opened occurs in the first main switch 86a when it is determined that the pulse signals output from the connection point between the collector of the third monitoring switch 106 and the resistive element 108 is not returned although the power is fed to the exciting coil 85.

Incidentally, the first monitoring unit 70a determines that the abnormality in which the first main switch 86a is fixed to be closed occurs in the first main switch 86a in the case where it is determined that the pulse signals output from the connection point between the collector of the third monitoring switch 106 and the resistive element 108 are returned when the power feed to the exciting coil 85 is stopped.

Each of the monitoring units 70a and 70b switches the first output side switch 80 to the open state when it is determined that the monitoring result of the corresponding monitoring unit does not match the acquired monitoring result with respect to the signal output unit including the second output side switch 83 and the first main switch 86a.

Incidentally, each of the monitoring units 70a and 70b may cut off the supply of the power to the respective robots 10 and 20 to stop the operation of the respective robots 10 and 20 when it is determined that the monitoring result of the corresponding monitoring unit does not match the acquired monitoring result with respect to the signal output unit including the second output side switch 83 and the first main switch 86a.

According to the present embodiment described above, the stop of the operation of the respective robots 10, 20, and 30 can be ensured. On the contrary, in a robot system illustrated in FIG. 4, there is a risk that the stop of the operation of the respective robots cannot be ensured. Hereinafter, the robot system will be described.

Figure 4:
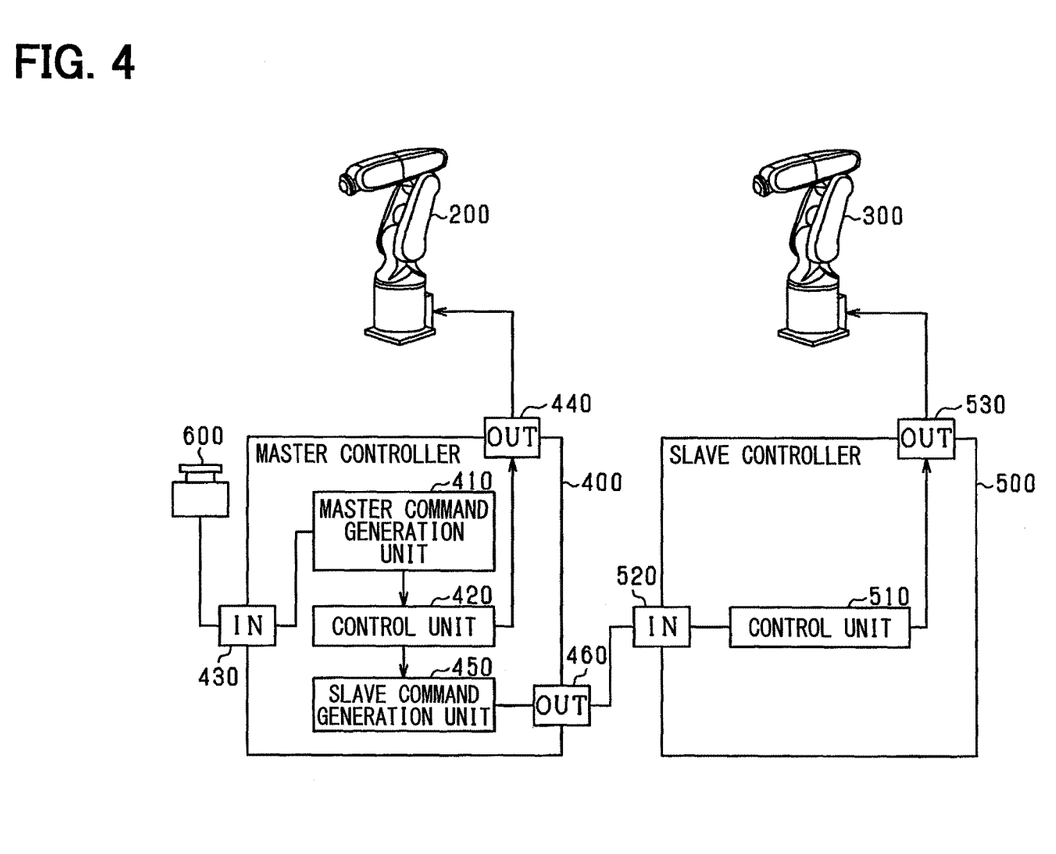
FIG. 4 is a diagram illustrating an overall configuration of a robot system according to a related art.

As illustrated in the figure, the robot system includes a master robot 200 and a slave robot 300. The master robot 200 is connected with a master controller 400, and the slave robot 300 is connected with a slave controller 500. The master controller 400 includes a master command generation unit 410 and a control unit 420. The master command generation unit 410 receives the safety signal from a safety device through an input interface unit 430. In FIG. 4, an emergency stop switch 600 is assumed as the safety device. The master command generation unit 410 generates an operation command value of the master robot 200 on the condition that the safety signal is input. The control unit 420 generates a control signal for operating the master robot 200 on the basis of the generated operation command value, and outputs the generated control signal to the master robot 200 through a first output interface unit 440.

The master controller 400 further includes a slave command generation unit 450. The slave command generation unit 450 acquires the operation command value generated by the master command generation unit 410 through the control unit 420, and generates the operation command value of the slave robot 300 on the basis of the acquired operation command value. The slave command generation unit 450 outputs the generated operation command value to a second output interface unit 460.

The slave controller 500 includes a control unit 510. The control unit 510 receives the operation command value output from the second output interface unit 460 through an input interface 520. The control unit 510 generates the control signal for operating the slave robot 300 on the basis of the input operation command value, and outputs the generated control signal to the slave robot 300 through an output interface 530.

The robot system illustrated in FIG. 4 is configured in such a manner that the safety signal is input to the master controller 400, but not input to the slave controller 500. Such a configuration may lead to a risk that the stop of the operation of the slave robot 300 cannot be ensured when the emergency stop switch 600 is pressed. In more detail, when the emergency stop switch 600 is pressed to stop the input of the safety signal to the master controller 400, a command for stopping the operation of the master robot 200 is output from the master command generation unit 410 to the control unit 420 to stop the operation of the master robot 200. In this example, when a failure occurs in the slave command generation unit 450, a command for stopping the operation of the slave robot 300 cannot be output from the slave command generation unit 450 to the control unit 510, resulting in a risk that the stop of the operation of the slave robot 300 cannot be ensured.

The present embodiment described above has the following advantages.

The safety circuit units 17, 27, and 37 output the signals sane as the safety signals to the respective second output interface units 18, 28, and 38 when determining that no failure occurs in the respective safety circuit units, and the safety signals are input to the respective first input interface units 13, 23, and 33. According to the above-described configuration, when determining that the failure occurs in the safety circuit units 17, 27, and 37, the safety circuit units 17, 27, and 37 do not output the signals same as the safety signals to the respective second output interface units 18, 28, and 38. Thus, it can be ensured that the signal having the degree of reliability equivalent to that of the safety signal output from the safety circuit unit 17 of the first controller 11 is input to the respective command generation units 22 and 32 of the second and third controllers 21 and 31. With the above-described configuration, the stop of the operation of the respective robots 10, 20, and 30 can be ensured.

In the present embodiment, the respective controllers 11, 21, and 31 include a configuration in which the signals sane as the safety signals are output from the respective safety circuit units 17, 27, and 37 to the respective second output interface units 18, 28, and 38, and a configuration in which the safety signals are input to the respective control units 15, 25, and 35 through the respective first input interface units 13, 23, and 33. Thus, the safety signals or the signals having the degree of reliability equivalent to that of the safety signals can be input to all of the respective controllers 11, 21, and 31. With the above-described configuration, all of the controllers 11, 21, and 31 for controlling the master robot 10 and the slave robots 20, 30, respectively, can have the same configuration. Therefore, according to the present embodiment, the controllers having the same configuration can be used regardless of whether the collaboration control of the master robot and the slave robots is performed, or the control of one robot is performed in the robot system. Hence, a load of the production management of the controllers can be reduced.

In the safety circuit units 17, 27, and 37, each of the first and second monitoring units 70a and 70b is configured to output the signal same as the safety signal to the respective second output interface units 18, 28, and 38 by closing the first output side switch 80 when determining that the monitoring result of the subject monitoring unit matches the acquired monitoring results, and determining that the safety signal is input. According to the above-described configuration, when it is determined that the monitoring result of the subject monitoring unit does not match the acquired monitoring result, each of the first and second monitoring units 70a and 70b does not output the signal same as the safety signal to the second output interface units 18, 28, and 38. Thus, with the determination that no failure occurs in each of the signal input unit and the signal output unit, the signal same as the safety signal can be output, and the degree of reliability of the signal same as the safety signal output to the outside from the second output interface units 18, 28, and 38 can be enhanced.

In the signal output unit, the exciting coil 85 and the first main switch 86a are electrically insulated from each other. Thus, when the second output side switch 83 is closed to output the signal same as the safety signal to, for example, the second output interface unit 18 of the first controller 11, even if the ground potential is different between the first controller 11 and the second controller 21, the signal same as the safety signal can be transmitted from the first controller 11 to the second controller 21 without causing a reduction in the degree of reliability of the signal same as the safety signal.

The first main switch 86a and the second main switch 87a are brought into the same operating state mechanically in conjunction with each other. Thus, whether the failure occurs in the second main switch 87a is monitored, and thereby whether the failure occurs in the first main switch 86a can be monitored. Each of the monitoring units 70a and 70b prohibits the output of the safety signal to the second output interface unit 18 when it is determined that the failure occurs in the second main switch 87a. With the above-described configuration, the degree of reliability of the signal same as the safety signal output from the second output interface unit 18 can be enhanced.

Moreover, in the present embodiment, whether the abnormality occurs is monitored with the use of the second main switch 87a electrically insulated from the first main switch 86a. Thus, whether the failure occurs in the first main switch 86a can be monitored without affecting the signal path that connects the first main switch 86a to the second output interface unit 18, and transmits the signal same as the safety signal.

Second Embodiment

Figure 5:
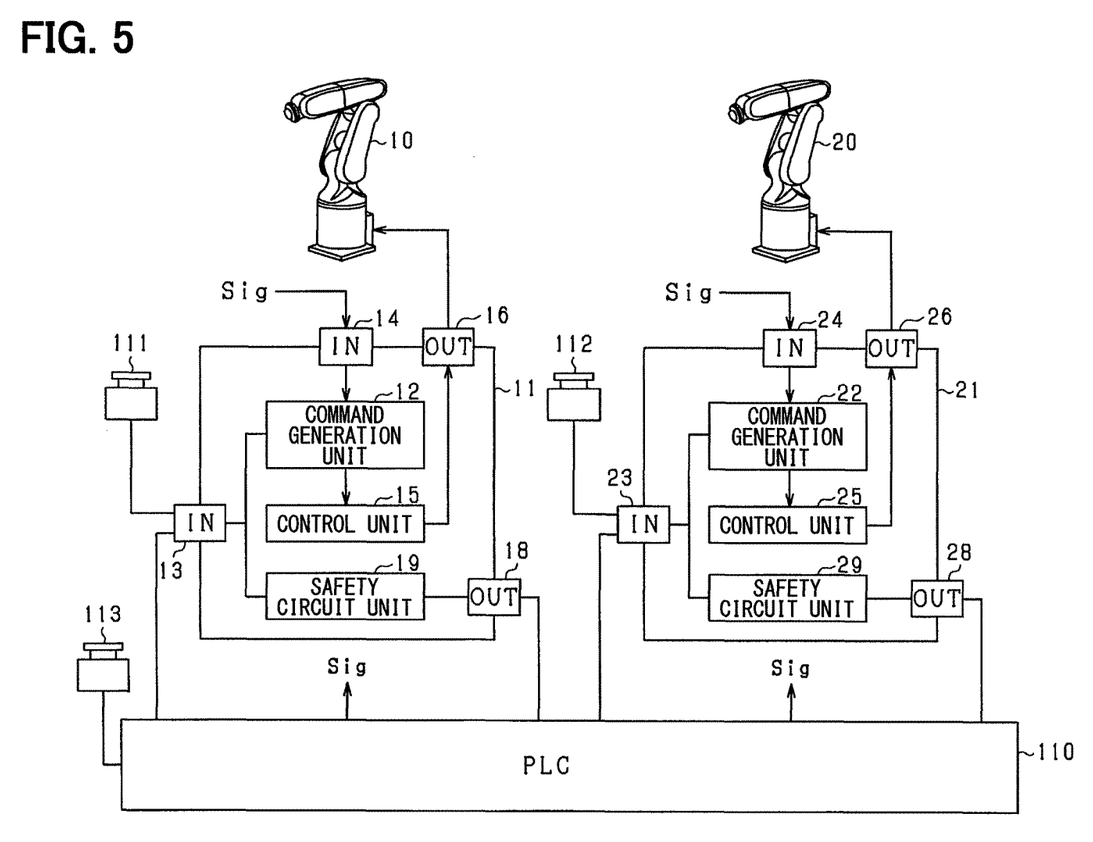
FIG. 5 is a diagram of an overall configuration of a robot system according to a second embodiment.

Hereinafter, a second embodiment will be described with reference to the drawings focusing on differences from the above-described first embodiment. In the present embodiment, as illustrated in FIG. 5, a connection manner of multiple controllers is changed. In FIG. 5, two robots 10 and 20 are provided in a robot system. Incidentally, in FIG. 5, for convenience, the same configurations as those in FIG. 1 are denoted by the same reference numerals or symbols.

A first input interface unit 13 of a first controller 11 is connected with a first emergency stop switch 111. A first input interface unit 23 of a second controller 21 is connected with a second emergency stop switch 112.

The robot system includes a programmable controller (hereinafter referred to as "PLC 110") that is a host control unit of the first controller 11 and the second controller 21. The PLC 110 is connected with the first input interface unit 13 and a second output interface unit 18 of the first controller 11, and the first input interface unit 23 and a second output interface unit 28 of the second controller 21 through individual communication lines. In addition, the PLC 110 is connected with a third emergency stop switch 113 through the communication line. Incidentally, the PLC 110 outputs an operation enable signal Sig to the first controller 11 and the second controller 21.

The first and second controllers 11 and 21 include safety circuit units 19 and 29, respectively. The respective safety circuit units 19 and 29 are basically identical in the configuration with the safety circuit units 17 and 27 in FIG. 1 described above, but configured to stop an output of the signal same as a safety signal even if any one of the first emergency stop switch 111, the second emergency stop switch 112, and the third emergency stop switch 113 is pressed by an operator. With the above-described configuration, the stop of the operation of the respective robots 10 and 20 when any of the respective emergency stop switches 111 to 113 is pressed by the operator is ensured.

Specifically, for example, when the first emergency stop switch 111 is pressed, an input of the safety signal to a command generation unit 12 and the safety circuit unit 19 through the first input interface unit 13 of the first controller 11 (corresponding to a reference control device) is stopped. With the above-described operation, the command generation unit 12 generates an operation stop command to stop the operation of the first robot 10.

In addition, the output of the signal same as the safety signal from the safety circuit unit 19 of the first controller 11 is stopped, to thereby stop the input of the safety signal to a command generation unit 22 through the second output interface unit 18, the PLC 110, and the first input interface unit 23 of the second controller 21. With the above-described configuration, the operation of the second robot 20 is stopped.

According to the present embodiment described above, when any one of the first emergency stop switch 111, the second emergency stop switch 112, and the third emergency stop switch 113 is pressed by the operator, the stop of the operation of the respective robots 10 and 20 can be ensured.

Other Embodiments

Incidentally, the above-described respective embodiments can be implemented with modifications described below.

In the above-described first embodiment, when the emergency stop switch 41 is configured by, for example, a switch of a triple system, the signal input unit and the signal output unit may be tripled.

In the above-described respective embodiments, when it is determined that the safety signal is not input to the first input interface unit, the safety circuit unit may cut off the power to be supplied to the robot corresponding to the subject safety circuit unit.

A connection manner of the multiple controllers is not limited to the connection manner illustrated in the above-described respective embodiments, but may be configured, for example, as follows.

In the above-described first embodiment, the number of controllers connected in series with the first controller 11 may be set to one, or may be set to four or more.

In addition, in the above-described first embodiment, the input interface units of the multiple controllers may be connected to at least one of the second output interface unit 18 of the first controller 11 and the second output interface unit 28 of the second controller 21.

Further, in the robot system including three or more robots, for example, the second output interface unit of the controller corresponding to one robot that receives the safety signal from the output source of the safety signal may be connected with the input interface units of the controllers corresponding to the remaining robots.

The robots are not limited to the vertical articulated type, but may be configured by for example, horizontal articulated type robots.

What is claimed is:
1. A robot system, comprising:
a plurality of robot control devices that are provided correspondingly to respective ones of a plurality of robots, individually, and that control driving of the corresponding robot; and
an emergency switch that is normally in a closed state and is changed into an opened state when operated by an operator, wherein
each of the plurality of robot control devices includes:
an input interface unit;
a control unit stopping an operation of the corresponding robot when determining that a safety signal is not input to the input interface unit;
an output interface unit; and
a safety circuit unit having a function of monitoring whether a failure occurs in the safety circuit unit, having a function of generating the safety signal and outputting the safety signal from the input interface unit, and including an insulation switch connected to the output interface units,
the plurality of robots includes a master robot and a slave robot,
the plurality of robot control devices includes a master control device controlling the master robot and a slave control device controlling the slave robot,
the input interface unit of the master control device is connected to the emergency switch,
when the emergency switch is in the closed state, the safety signal generated by the safety circuit unit of the master control device and output from the input interface unit of the master control device is input to the input interface unit of the master control device through the emergency switch,
when the emergency switch is in the opened state, the safety signal is not output from the input interface unit of the master control device,
the insulation switch of the master control device is connected with the input interface unit of the slave control device through the output interface unit of the master control device,
in each of the master control device and the slave control device, the safety circuit unit operates the insulation switch to be in the closed state when determining that no failure occurs in the safety circuit unit, and determining that the safety signal is input to the input interface unit, when the insulation switch of the master control device is in the closed state, the safety signal generated by the safety circuit unit of the slave control device is output from the input interface unit of the slave control device and is input to the input interface unit of the slave control device through the output interface unit of the master control device, the insulation switch of the master control device and the output interface unit of the master control device, and when the insulation switch of the master control device is in the opened state, the safety signal is not output from the input interface unit of the slave control device.

2. The robot system according to claim 1, wherein
in each of the master control device and the slave control device, the safety circuit unit cuts off a power to be supplied to the corresponding robot when determining that the failure occurs in the safety circuit unit, or determining that the safety signal is not input to the input interface unit.

3. The robot system according to claim 1, wherein
in each of the master control device and the slave control device, the safety circuit unit further includes:
an exciting coil;
an output side power supply; and
an exciting switch that is closed to feed power from the output side power supply to the exciting coil, and is opened to stop the power feeding from the output side power supply to the exciting coil, wherein:
the insulation switch is closed by feeding the power to the exciting coil and is opened by stopping the power feeding to the exciting coil,
the exciting coil and the insulation switch are electrically insulated from each other, and
in each of the master control device and the slave control device, the safety circuit unit operates the insulation switch to be in the closed state by closing the exciting switch.

4. The robot system according to claim 3, wherein
the insulation switch is set as a first insulation switch,
in each of the master control device and the slave control device, the safety circuit unit further includes a second insulation switch that is opened and closed mechanically in conjunction with the first insulation switch, opened when the first insulation switch is opened, and closed when the first insulation switch is closed,
the first insulation switch and the second insulation switch are electrically insulated from each other, and
in each of the master control device and the slave control device, the safety circuit unit further has a function of monitoring whether a failure occurs in the second insulation switch, and prohibits closing of the exciting switch when determining that the failure occurs in the second insulation switch.

5. The robot system according to claim 3, wherein
in each of the master control device and the slave control device, the safety circuit unit further includes:
a plurality of signal input units connected to the input interface unit and transmitting the safety signal input to the input interface unit;
a plurality of monitoring units connected correspondingly to the plurality of signal input units, respectively, receiving the safety signal transmitted through the corresponding signal input unit, and operating the insulation switch to be in the closed state; and
a plurality of signal output units connected correspondingly to the plurality of monitoring units, respectively, and including the exciting coil, the exciting switch, and the insulation switch,
in each of the master control device and the slave control device, each of the plurality of monitoring units has a function of monitoring whether a failure occurs in the corresponding signal input unit and the corresponding signal output unit connected to the subject monitoring unit, and is configured to acquire monitoring results of each other, and
in each of the master control device and the slave control device, each of the plurality of monitoring units operates the exciting switch to be in the closed state when determining that the monitoring result of the subject monitoring unit matches the acquired monitoring results, and determining that the subject monitoring unit receives the safety signal through the corresponding signal input unit.

6. The robot system according to claim 1, further comprising:
a host control device that controls processing in each of the plurality of robot control devices, wherein
the input interface unit of the slave control device is connected with the output interface unit of the master control device through the host control device.

7. The robot system according to claim 1, wherein
in each of the master control device and the slave control device, the safety circuit unit further includes:
an input side power supply connected with the input interface unit; and
a resistor connected with a ground,
the input power supply of the master control device is connected with a first end of the emergency switch through the input interface unit of the master control device,
a second end of the emergency switch is connected with the ground through the input interface unit of the master control device and the resistor of the master control device,
when the emergency switch is in the closed state, a first closed circuit including the input side power supply of the master control device, the input interface unit of the master control device, the emergency switch, the resistor of the master control device, and the ground is formed so that the safety signal output from the input interface unit of the master control device is input to the input interface unit of the master control device through the emergency switch,
when the emergency switch is in the opened state, the first closed circuit is not formed so that the safety signal is not output from the input interface unit of the master control device,
a first end of the insulation switch of the master control device is connected with the input side power supply of the slave control device through the output interface unit of the master control device and the input interface unit of the slave control device,
a second end of the insulation switch of the master control device is connected with the ground through the output interface unit of the master control device, the input interface unit of the slave control device, and the resistor of the slave control device,
when the insulation switch of the master control device is in the closed state, a second closed circuit including the input side power supply of the slave control device, the input interface unit of the slave control device, the output interface unit of the master control device, the insulation switch of the master control device, the resistor of the slave control device, and the ground is formed so that the safety signal is output from the input interface of the slave control device and is input to the input interface of the slave control device through the output interface of the master control device, the insulation switch of the master control device, and the output interface of the master control device, and when the insulation switch of the master control device is in the opened state, the second closed circuit is not formed so that the safety signal is not output from the input interface unit of the slave control device.

* * * * *